(12) United States Patent
Groeger et al.

(10) Patent No.: US 7,706,512 B2
(45) Date of Patent: Apr. 27, 2010

(54) METHOD AND APPARATUS FOR VOICE MESSAGE EDITING

(75) Inventors: Steven Groeger, Poole (GB); Stuart John Hayton, Waterlooville (GB); Jamie Lister, Longueville (AU); Timothy David Poultney, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1154 days.

(21) Appl. No.: 11/322,032

(22) Filed: Dec. 29, 2005

(65) Prior Publication Data

US 2006/0182238 A1 Aug. 17, 2006

(30) Foreign Application Priority Data

Feb. 16, 2005 (GB) ................................. 0503162.0

(51) Int. Cl.
*H04M 11/00* (2006.01)

(52) U.S. Cl. ................... 379/88.16; 379/75; 379/88.25; 704/252; 704/253; 704/254

(58) Field of Classification Search .............. 379/88.16, 379/75, 88.25, 68; 704/252, 253, 254
See application file for complete search history.

(56) References Cited

U.S. PATENT DOCUMENTS

| 4,625,081 | A | * | 11/1986 | Lotito et al. | ............. 379/88.26 |
| 4,757,525 | A | * | 7/1988 | Matthews et al. | ........ 379/88.26 |
| 5,199,077 | A | * | 3/1993 | Wilcox et al. | ................ 704/256 |
| 5,842,170 | A | * | 11/1998 | Daberko et al. | ............. 704/278 |
| 6,385,306 | B1 | * | 5/2002 | Baxter, Jr. | ................ 379/88.13 |
| 6,453,281 | B1 | * | 9/2002 | Walters et al. | .............. 704/200 |
| 6,591,240 | B1 | * | 7/2003 | Abe | .......................... 704/278 |
| 6,625,260 | B1 | * | 9/2003 | Brockman et al. | ....... 379/88.21 |
| 2009/0024389 | A1 | * | 1/2009 | Khouri et al. | ............... 704/235 |

FOREIGN PATENT DOCUMENTS

DE 3429769 9/1986

OTHER PUBLICATIONS

Lewis, J.R., et al., "System and Method for Searching Audio Segments", IBM Technical Disclosure Bulletin, Aug. 21, 2003.

* cited by examiner

*Primary Examiner*—Olisa Anwah
(74) *Attorney, Agent, or Firm*—Novak Druce + Quigg

(57) ABSTRACT

A method and apparatus for voice message editing, particularly a method and apparatus for splicing voicemails sections together. A system, method and computer program product are described for forming a voice message on an interactive voice response system (IVR) spoken by a user including recording a first voice message where the user speaks the first voice message but makes an error in a last portion of the first voice message. A second voice message is recorded where the user speaks the last portion again without the error. Splice points are determined in the first and second voice messages. The first and second voice messages are spliced at the splice points such that the spliced first and second voice message is a continuous voice message including the last portion but not including the error.

6 Claims, 2 Drawing Sheets

METHOD AND APPARATUS FOR VOICE MESSAGE EDITING

CROSS-REFERENCE TO RELATED APPLICATIONS

This application claims the benefit of United Kingdom Patent Application No. 0503162.0 filed Feb. 16, 2005.

FIELD OF THE INVENTION

This invention relates to a method and apparatus for voice message editing. In particular it relates to a method and apparatus for splicing voicemail sections together.

BACKGROUND OF THE INVENTION

An interactive voice response system (IVR) is a computer connected to a telephony network and providing integration between the two. The telephony network can be a plain old telephony system such as a line switched telephony network or a packet switched telephony network like a voice-over-internet-protocol (VoIP) network. An IVR typically runs a telephony application that controls the interaction of a user and the IVR. Such a voice application is a voicemail application controlling the interaction between a user and the computer, on its own or part of another voice interaction.

A voicemail telephony application requires the recording of audio messages directly into an IVR system over the telephone. This method of recording can be cumbersome when working with lengthy passages of speech, especially if a mistake is made while reading a passage. Often mispronouncing a word or coughing during a lengthy passage creates undesired audio data in the segment. Such undesired audio data (called artefacts below) can result in having to re-record the entire message which costs both time and money.

It would be useful to have a voice message system which did not require a complete re-record of the voice message.

SUMMARY OF THE INVENTION

According to a first aspect of the present invention there is provided a method of forming a voice message on an interactive voice response system (IVR) spoken by a user, including recording a first voice message where the user speaks the first voice message but makes an error in a last portion of the first voice message, recording a second voice message where the user speaks the last portion again without the error, determining splice point in the first and second voice messages, and splicing the first and second voice messages at the splice points such that the spliced first and second voice message is a continuous voice message including the last portion but not including the error.

A second aspect of the invention relates to a system for forming a voice message on an interactive voice response system (IVR) spoken by a user including means for recording a first voice message where the user speaks the first voice message but makes an error in a last portion of the first voice message, means for recording a second voice message where the user speaks the last portion again without the error, means for determining splice points in the first and second voice messages, and means for splicing the first and second voice messages at the splice points such that the spliced first and second voice message is a continuous voice message including the last portion but not including the error.

A third aspect of the invention relates to a computer program product for processing one or more sets of data processing tasks to construct a voice message on an interactive voice response system (IVR). The computer program product includes computer program instructions stored on a computer-readable storage medium for, when loaded into a computer and executed, causing a computer to carry out the steps of recording a first voice message where the user speaks the first voice message but makes an error in a last portion of the first voice message, recording a second voice message where the user speaks the last portion again without the error, determining splice points in the first and second voice messages, and splicing the first and second voice messages at the splice points such that the spliced first and second voice message is a continuous voice message including the last portion but not including the error.

Such a method, system or computer program product splices a second voice message and a first voice message and eliminates the need for re-recording the whole of the first message.

Advantageously, determination of the splice points comprises determining regions of common voice data in the first and second messages wherein the splice points are corresponding points within the regions of common voice data.

In a preferred embodiment, the determination of the common regions and the splice points comprises the following steps: performing phoneme recognition on the first and second messages to acquire corresponding first and second recognition phonemes; determining regions of common phonemes in the first and second recognition phonemes; and determining the corresponding regions in the first and second voice messages.

In another embodiment, the determination of the common region and splice point is performed by comparing the signal energy over time of the first and second voice messages and determining the most similar energy patterns, the splice point is a low point in the signal which is assumed to be a space between two words.

Using phoneme based speech recognition to determine the splice point means that the splice point will lie between two silences in a phrase but not use the full processing resources needed to identify complete words.

Using the phoneme string allows for an excellent comparison of the messages and also allows for an accurate determination of space between two words for the splice point. Using phoneme recognition means that the recognition is unconstrained by a word grammar.

However, in another embodiment, word based speech recognition could improve the accuracy of the determination of the splice point while using more processing power. Furthermore using word based speech recognition allows splice points to be precisely located between words, whereas phoneme based recognition relies on the silences between the phonemes.

For example, a caller presses a key when an error is made while recording an audio message. The key press causes the ceasing of the first recording; prompts the user to start reading the message from before the recorded mistake; and starts a second recording. By applying a speech recognition engine to the first and second recorded messages it is possible to estimate the location of the error in the first recording and splice the two audio streams together to remove the error. This will greatly speed up and increase the ease of use of recording lengthy audio segments directly into an IVR.

In this implementation the IVR application will record the first audio segments and the user will signal an error by pressing, say, the * key to generate a digital tone. On receipt of * key digital tone, the IVR will prompt the caller to start speaking, starting from before the error was made. When the supplemental recording is finished, both recordings will be submitted to speech recognition. The returned text from the recognition engine is compared to see where the overlap is, and the timestamps for the matching phrases in each recording will be collected via the speech recognition engine. The two recordings will then be joined together based on these time stamps.

BRIEF DESCRIPTION OF THE DRAWINGS

Embodiments of the invention will now be described, by means of example only, with reference to the accompanying drawings in which.

DESCRIPTION OF THE PREFERRED EMBODIMENTS

Figure 1:
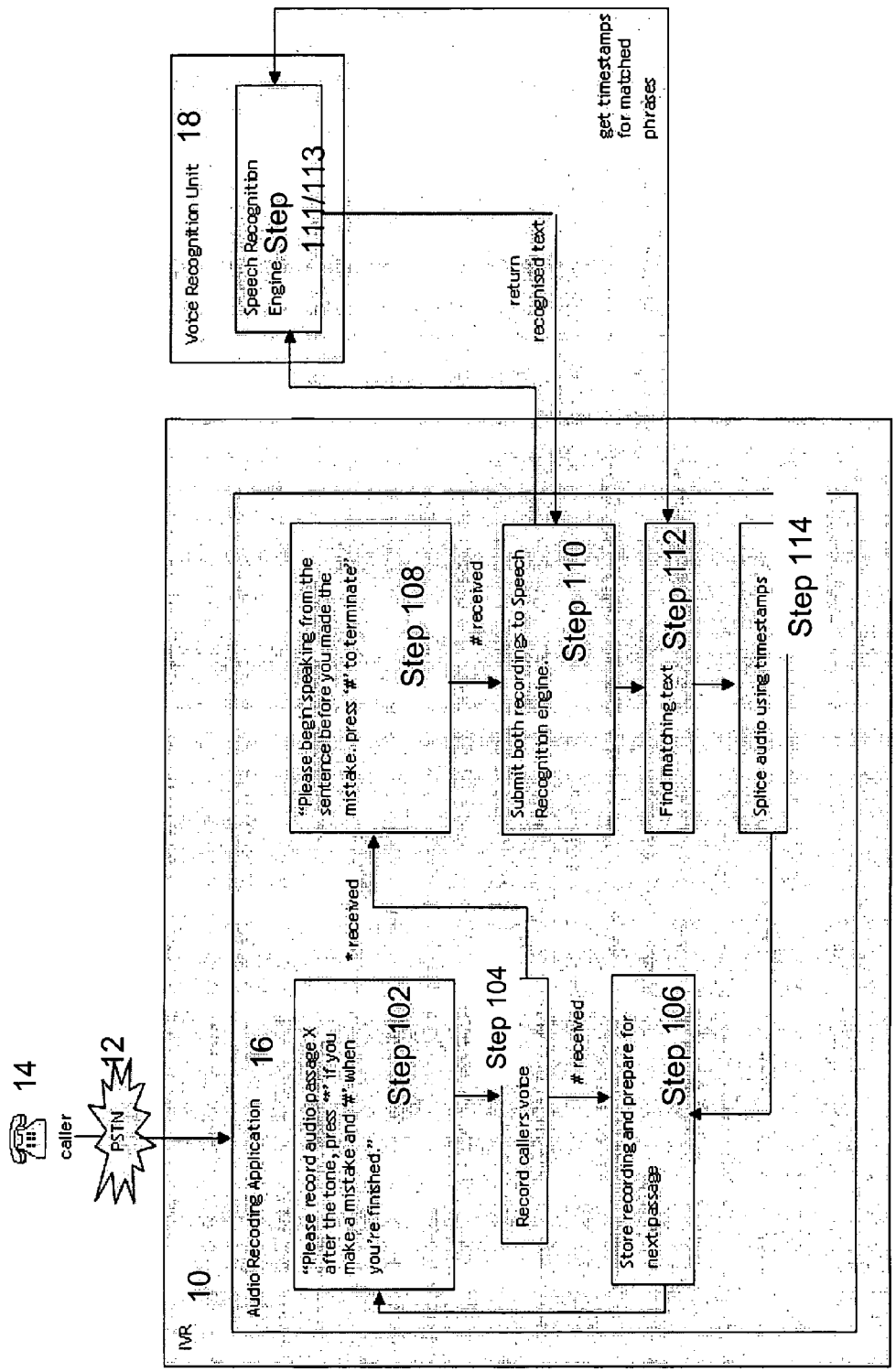
FIG. 1 shows an IVR system according to the preferred embodiment.

Referring to FIG. 1 there is shown an interactive voice response system (IVR) 10 connected through a telephony switch (PSTN) 12 to a caller 14. Caller 14 is one of many callers that could be connected to the IVR 10. IVR 10 comprises: audio recording application 16 and voice recognition unit 18. Audio recording application 16 is a control program for performing method steps 102, 104, 106, 108, 110, 112 and 114. Voice recognition unit 18 comprises a control program for performing speech recognition steps 111 and 113. In this description, the user is referred to as a caller since the IVR calls are normally considered incoming from the user, however the call may be outgoing with the user being the called party.

Audio recording application 16 is activated when a caller connects to the IVR and makes a request to leave a voice message.

Step 102 of the audio recording application triggers the IVR to play a prompt to the caller to request the recording of the first voice message. In this embodiment the prompt states "Please record audio passage X after the tone, press * if you make a mistake and # when you're finished". The caller understands that when a mistake has been made in recording then he should press the * key. If no mistake is made then he understands to press the # key at the end of the voice message.

In step 104, the audio recording application records the caller's voice as a first voice message and monitors for a key press. If the # key is pressed then the end of the voice recording has been received without an error and the process moves to step 106. If the * is pressed then an error has been received and the process moves to step 108.

In step 106, the audio recording application stores the recording made in step 104 as a first voice message and prepares for another voice message to be recorded by returning control to step 102. At this stage the caller may also quit the audio recording application if satisfied with the recorded audio. Step 106 also takes a recording input from step 114, in this case the recording is a spliced recording made in step 114.

In step 108, the audio recording application directs the IVR to play a prompt to the caller to request the recording of the second voice message. In the preferred embodiment the prompt states "Please begin speaking from the sentence before you made the mistake, press # to terminate". The caller understands that they must start speaking from a point in the sentence before the error was made and then to finish the recording by pressing # at the end. The caller's voice is recorded as the second voice message.

In step 110, both first and second voice messages are submitted to the voice recognition unit 18 and first and second recognition texts are returned. Each recognition text comprises a string of text labels corresponding to the voice message.

In step 111, the voice recognition unit processes the first and second voice messages. In the preferred embodiment, only partial speech recognition is performed and the text labels returned are the phonemes corresponding to the voice data. In another embodiment, human readable text is returned.

In step 112, the audio recording application locates the matching text labels in the first and second text messages. The positions of the matching labels in the first and second text messages are inserted into a query for the voice recognition unit. Using the position of the matching labels the voice recognition unit locates a first timestamp in the first voice message and a second timestamp in the second voice message. These timestamps represent the splice points in the first and second voice messages.

In step 113, the voice recognition unit receives the timestamp query and returns the first and second timestamps. In another embodiment the timestamps for the text labels may be supplied by the voice recognition unit at the same time as the text labels.

In step 114 the located first and second timestamps are used to splice the first and second voice segments together. The process then returns to step 106 where the spliced voice segment is recorded and the audio application exits or prepares for the next passage.

The preferred embodiment related to a voice mail IVR but such a solution could be used in other voice applications such as personal voice dictation.

Figure 2:
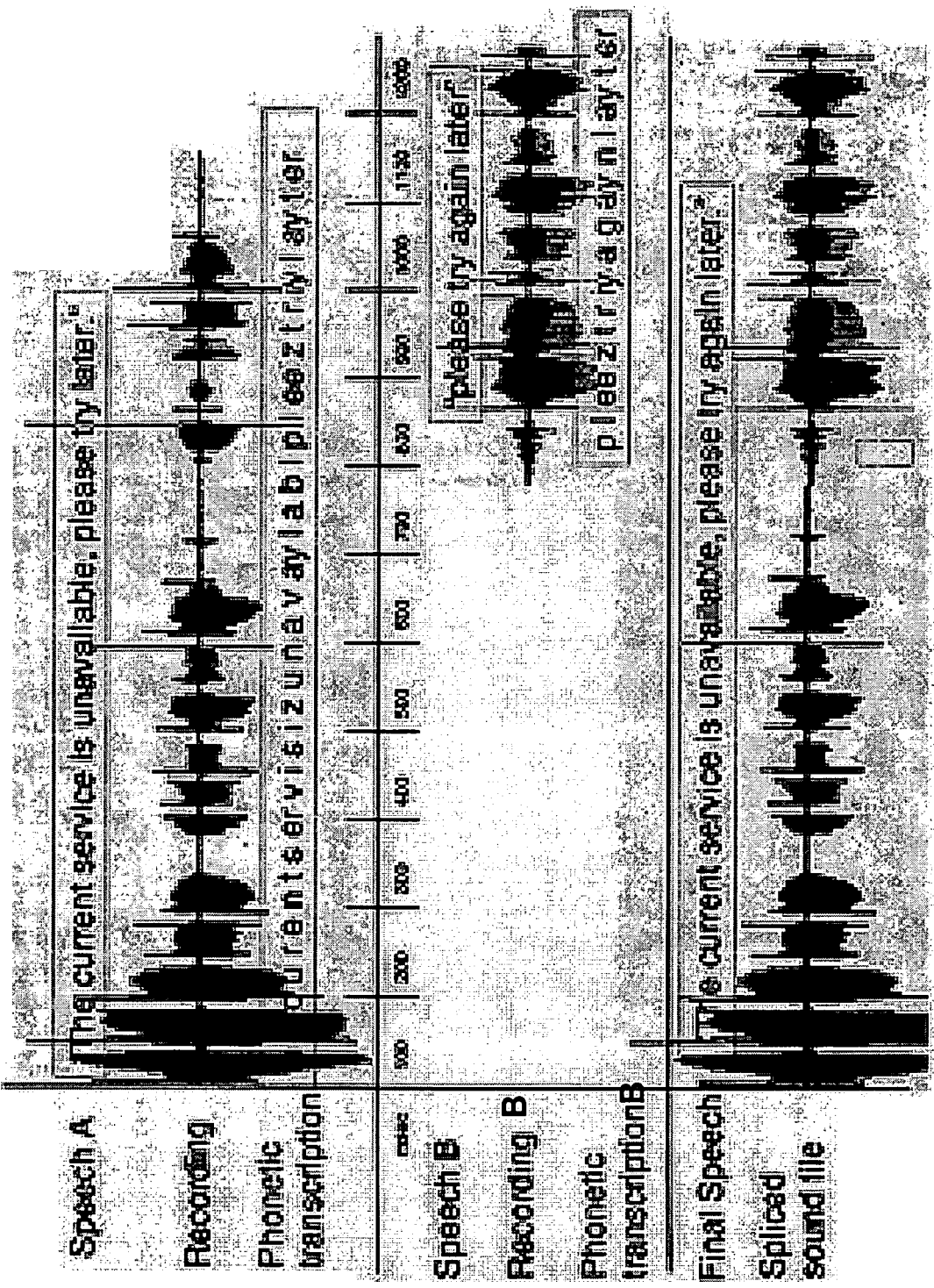
FIG. 2 shows example speech signals being processed by the preferred embodiment.

An example of the words, speech signal and phonetic transcription involved in splicing two voice messages is shown in FIG. 2. The user speaks the First voice message Speech A "The current service is unavailable, please try later" which is shown at the top of FIG. 2. Directly underneath Speech A in FIG. 2 is Recording A—an example of the signal amplitude against time corresponding to the words in Speech A. Directly underneath Recording A is Phonetic transcription A representing the phoneme string derived from Recording A by the Voice Recognition Unit. The time scale in milliseconds is shown along the x axis under Phonetic transcription A. For any given text, or phoneme string or signal, the voice recognition unit can return the start timestamp and the end timestamp.

The user speaks the Second voice message Speech B "please try again later" shown under the time scale access in FIG. 2. Directly underneath Speech B is Recording B—an example of the signal against time corresponding to the words in Speech B. Directly underneath Recording B is Phonetic transcription B representing the phoneme string derived from Recording B by the Voice Recognition Unit. The time scale in milliseconds along the x axis only represents the relative time scale for Phonetic transcription B.

The resultant strings of phonemes are shown below:

(A) Phonetic transcription A "thequrreentservisizunavaylablpleeztriylayter";

(B) Phonetic transcription B "pleeztriyagaynlayter"

The goal of alignment is to find where the second message begins in the first message. The preferred embodiment finds the longest substring between the two—in this case the 'pleeztriy' substring. A user of this embodiment will tend to say a similar or identical phrase as a reference to align against, and then say something different (the intended correction). The preferred method is to retain the audio of the first voice message up to the splice point (just before the first occurrence of the phonemes similar to the second voice message) and add all audio from the second voice message.

The preferred embodiment works well with good voice recognition; imperfect recognition accuracy will introduce errors in the form of insertions, repetitions, substitutions and deletions of phonemes. In this case a more complicated matching algorithm can be used which take into account the possibility of recognition errors.

A further example is now described when full speech recognition is used and this example is not illustrated.

A user reads: " . . . Two rises in three months would have poured fuel on the fire of expectations of further rises to come, potentially **". In this example ** represents a cough, another noise made in error, or any other error. The IVR records this as a first voice message.

The user keys: * and continues to read: "expectations of further rises to come, potentially pushing the pound to damaging levels against the dollar . . . ". The IVR records this reading as a second voice message.

The user keys: # to terminate the recording of the second voice message.

The two voice messages are returned as text messages from a speech recognition engine:

First text message: " . . . Two rises in three months would have poured fuel on the fire of expectations of further rises to come, potentially #####" where the ##### represents the letters returned by the recogniser representing the error.

Second text message: "expectations of further rises to come, potentially pushing the pound to damaging levels against the dollar . . . "

The texts of the voice messages are further processed to determine the overlapping parts:

First text message: " . . . Two rises in three months would have poured fuel on the fire of expectations of further rises to come, potentially ####"

Second text message: "expectations of further rises to come, potentially pushing the pound to damaging levels against the dollar . . . " where the overlapping parts are underlined.

Timestamps (in seconds) in the voice messages corresponding to the beginning and end of the matched phrase in the first text segment and the second text message are acquired.

First voice message: 05:06:43-05:09:90 seconds
Second voice message: 00:02.81-00:05:27 seconds The first and second voice messages are joined based on acquired timestamps: Final voice message=First voice message (00:00:00-05:06:43)+second voice message (00:02:81-end of audio).

The audio recording application of the preferred embodiment is part of a messaging system on an IVR server and telephony system. However, in an alternative embodiment, the audio recording application maybe part of the telephone or client device and interacts to leave a completed message with a messaging system on an IVR server. In this alternative embodiment the client may need to download the audio recording program from a server before execution.

In summary, the present invention relates to a method and apparatus for voice message editing. In particular it relates to a method and apparatus for splicing voicemails sections together. There is described a system, method and computer program product of forming a voice message on an interactive voice response system (IVR) spoken by a user comprising: recording a first voice message wherein the user speaks the first voice message but makes an error in a last portion of the first voice message; recording a second voice message wherein the user speaks the last portion again without the error; determining splice points in the first and second voice messages; and splicing the first and second voice messages at the splice points whereby the spliced first and second voice message is a continuous voice message including the last portion but not including the error.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

We claim:

1. A method of forming a voice message spoken by a user on an interactive voice response system (IVR) comprising:
   prompting the user to record a first voice message and prompting the user to press a first key when the user is finished and press a second key if the user makes an error;
   storing the recorded first voice message if the first key is pressed;
   prompting the user to record a second voice message if the second key is pressed, wherein the second voice message starts from a point in the first voice message before the error;
   when the second voice message is finished, submitting the first and second voice messages for recognition to obtain a first recognition text and a second recognition text;
   determining splice points in the first and second voice messages by comparing the first and second recognition texts of the first and second voice messages and determining regions of matching text, wherein the splice points are corresponding points within the regions of the matching text; and
   splicing the first and second voice messages at the splice points whereby the spliced first and second voice message is a continuous voice message without the error.

2. The method according to claim 1, wherein each of the first and second recognition texts comprises a phoneme string or human-readable text.

3. A system of forming a voice message on an interactive voice response system (IVR) spoken by a user comprising:
   at least one memory for storing recorded voice messages;
   at least one processor configured to:

prompt the user to record a first voice message and prompt the user to press a first key when the user is finished and press a second key if the user makes an error;

store the recorded first voice message in the memory if the first key is pressed;

prompt the user to record a second voice message if the second key is pressed, wherein the second voice message starts from a point in the first voice message before the error;

when the second voice message is finished, submit the first and second voice messages to a speech recognition engine for recognition to obtain a first recognition text and a second recognition text;

determine splice points in the first and second voice messages by comparing the first and second recognition texts of the first and second voice messages and determining regions of matching text, wherein the splice points are corresponding points within the regions of the matching text; and splice the first and second voice messages at the splice points whereby the spliced first and second voice message is a continuous voice message without the error.

4. The system according to claim 3, wherein each of the first and second recognition texts comprises a phoneme string or human-readable text.

5. A computer-readable storage medium, having stored thereon a computer program having a plurality of code sections executable by a computer for causing the computer to perform the steps of:

prompting a user to record a first voice message and prompting the user to press a first key when the user is finished and press a second key if the user makes an error;

storing the recorded first voice message if the first key is pressed;

prompting the user to record a second voice message if the second key is pressed, wherein the second voice message starts from a point in the first voice message before the error;

when the second voice message is finished, submitting the first and second voice messages for recognition to obtain a first recognition text and a second recognition text;

determining splice points in the first and second voice messages by comparing the first and second recognition texts of the first and second voice messages and determining regions of matching text, wherein the splice points are corresponding points within the regions of the matching text; and splicing the first and second voice messages at the splice points whereby the spliced first and second voice message is a continuous voice message without the error.

6. The computer-readable storage medium according to claim 5, wherein each of the first and second recognition texts comprises a phoneme string or human-readable text.

* * * * *